(12) United States Patent
Hiyama et al.

(10) Patent No.: US 9,438,839 B2
(45) Date of Patent: Sep. 6, 2016

(54) SOLID STATE IMAGING APPARATUS AND IMAGING SYSTEM USING THE SAME

(71) Applicant: CANON KABUSHIKI KAISHA, Tokyo (JP)

(72) Inventors: Hiroki Hiyama, Sagamihara (JP); Yasuji Ikeda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/564,506

(22) Filed: Dec. 9, 2014

(65) Prior Publication Data
US 2015/0189249 A1    Jul. 2, 2015

(30) Foreign Application Priority Data

Dec. 27, 2013   (JP) .................................. 2013-272655

(51) Int. Cl.
| H04N 5/378 | (2011.01) |
| H04N 5/347 | (2011.01) |
| H04N 9/04 | (2006.01) |
| H04N 5/3745 | (2011.01) |

(52) U.S. Cl.
CPC .............. *H04N 5/378* (2013.01); *H04N 5/347* (2013.01); *H04N 5/37457* (2013.01); *H04N 9/045* (2013.01)

(58) Field of Classification Search
CPC .. H04N 5/378; H04N 5/347; H04N 5/37457; H04N 9/045
USPC ............... 348/273, 279, 281, 294; 250/208.1
See application file for complete search history.

(56) References Cited

U.S. PATENT DOCUMENTS

| 6,188,094 B1 | 2/2001 | Kochi et al. |
| 6,670,990 B1 | 12/2003 | Kochi et al. |
| 6,960,751 B2 | 11/2005 | Hiyama et al. |
| 7,110,030 B1 | 9/2006 | Kochi et al. |
| 7,187,052 B2 | 3/2007 | Okita et al. |
| 7,283,305 B2 | 10/2007 | Okita et al. |
| 7,429,764 B2 | 9/2008 | Koizumi et al. |
| 7,538,804 B2 | 5/2009 | Okita et al. |
| 7,557,847 B2 | 7/2009 | Okita et al. |
| 7,638,826 B2 | 12/2009 | Hiyama et al. |
| 7,755,688 B2 | 7/2010 | Hatano et al. |
| 7,812,873 B2 | 10/2010 | Hiyama et al. |
| 7,812,876 B2 | 10/2010 | Hiyama et al. |
| 8,045,034 B2 | 10/2011 | Shibata et al. |
| 8,106,955 B2 | 1/2012 | Okita et al. |
| 8,120,686 B2 | 2/2012 | Hatano et al. |

(Continued)

FOREIGN PATENT DOCUMENTS

JP    2013-66140    4/2013

*Primary Examiner* — Nhan T Tran
(74) *Attorney, Agent, or Firm* — Fitzpatrick, Cella, Harper & Scinto

(57) ABSTRACT

A solid state imaging apparatus includes: a pixel array in which pixels having color filters are arrayed in a matrix shape in accordance with a predetermined color arrangement, with each pixel including a plurality of divided pixels having a color filter of the same color; and an adding circuit that performs addition averaging of a plurality of signals output from the divided pixels included in a plurality of pixels having color filters of the same color. Among a plurality of pixels that are an object of the addition averaging, a number of signals output from the respective divided pixels of which the adding circuit performs addition averaging is different for at least one pixel relative to the other pixels.

11 Claims, 10 Drawing Sheets

(56) References Cited

U.S. PATENT DOCUMENTS

| | | |
|---|---|---|
| 8,208,055 B2 | 6/2012 | Hiyama |
| 8,218,050 B2 | 7/2012 | Ogura et al. |
| 8,325,260 B2 | 12/2012 | Yamazaki et al. |
| 8,451,360 B2 | 5/2013 | Nakamura et al. |
| 8,493,487 B2 | 7/2013 | Takada et al. |
| 8,598,901 B2 | 12/2013 | Hiyama et al. |
| 8,643,765 B2 | 2/2014 | Takada et al. |
| 8,711,259 B2 | 4/2014 | Maehashi et al. |
| 8,785,832 B2 | 7/2014 | Ikeda |
| 8,836,838 B2 | 9/2014 | Nakamura et al. |
| 8,928,786 B2 | 1/2015 | Iwata et al. |
| 2012/0312963 A1* | 12/2012 | Storm .................... H04N 5/347 250/208.1 |
| 2013/0026343 A1 | 1/2013 | Saito et al. |
| 2013/0062503 A1 | 3/2013 | Saito et al. |
| 2013/0068930 A1 | 3/2013 | Nakamura et al. |
| 2013/0075588 A1* | 3/2013 | Kawaguchi ............ H04N 5/374 250/208.1 |
| 2013/0206961 A1 | 8/2013 | Ikeda et al. |
| 2014/0071244 A1* | 3/2014 | Hirota .................... H04N 5/347 348/46 |
| 2014/0192250 A1 | 7/2014 | Mitsunaga |
| 2014/0267865 A1* | 9/2014 | Kishi ..................... H04N 5/378 348/310 |
| 2014/0312207 A1 | 10/2014 | Ikeda et al. |
| 2014/0320717 A1 | 10/2014 | Hiyama et al. |
| 2015/0062394 A1* | 3/2015 | Ikeda ................ H04N 5/37457 348/302 |
| 2015/0077607 A1 | 3/2015 | Yamazaki et al. |

\* cited by examiner

FIG. 6A

COLUMN
| | 1 | 2 | 3 | 4 | 5 | 6 |
|---|---|---|---|---|---|---|
| 10 | Gb | B | Gb | B | Gb | B |
| 9 | R | Gr | R | Gr | R | Gr |
| 8 | Gb | B | Gb | B | Gb | B |
| 7 | R | Gr | R | Gr | R | Gr |
| 6 | Gb | B | Gb | B | Gb | B |
| 5 | R | Gr | R | Gr | R | Gr |
| 4 | Gb | B | Gb | B | Gb | B |
| 3 | R | Gr | R | Gr | R | Gr |
| 2 | Gb | B | Gb | B | Gb | B |
| 1 | R | Gr | R | Gr | R | Gr |

ROW

1 : 1 ADDITION
1 : 2 : 1 ADDITION

FIG. 6B

COLUMN
| | 1 | 2 | 3 | 4 | 5 | 6 |
|---|---|---|---|---|---|---|
| ADDITION OF 4TH AND 6TH ROW | Gb | B | Gb | B | Gb | B |
| ADDITION OF 1ST, 3RD AND 5TH ROW | R | Gr | R | Gr | R | Gr |

1 : 2 : 1 ADDITION
1 : 1 ADDITION

FIG. 6C

| | 1 | 2 | 3 | 4 | 5 | 6 |
|---|---|---|---|---|---|---|
| 6 | | | | | | |
| 5 | | | Gb(53) | | B(55) | |
| 4 | | | | | | |
| 3 | | | R(33) | | Gr(35) | |
| 2 | | | | | | |
| 1 | | | | | | |

FIG. 6D

| | 1 | 2 | 3 | 4 | 5 | 6 |
|---|---|---|---|---|---|---|
| 6 | Gb | | Gb | B | Gb | B |
| 5 | R | | R | Gr | R | Gr |
| 4 | Gb | | Gb | B | Gb | B |
| 3 | R | | R | Gr | R | Gr |
| 2 | | | | | | |
| 1 | R | | R | Gr | R | Gr |

SOLID STATE IMAGING APPARATUS AND IMAGING SYSTEM USING THE SAME

BACKGROUND OF THE INVENTION

1. Field of the Invention

The present invention relates to a solid-state imaging apparatus and an imaging system that uses the solid-state imaging apparatus.

2. Description of the Related Art

Technology has been proposed in which divided pixels that are obtained by dividing respective pixels of the same color into a plurality of parts are disposed at a pitch that is less than or equal to the repetition pitch of color filters in a CMOS image sensor. For example, in Japanese Patent Application Laid-Open No. 2013-66140 an image sensor is disclosed in which a dynamic range is enlarged by sequentially transferring electric charges of divided pixels having different sensitivities that are included in the same pixel to a floating diffusion region, and then adding the electric charges and reading out the resulting charges.

Although Japanese Patent Application Laid-Open No. 2013-66140 discloses that photoelectric conversion signals of divided pixels are added and read out for the respective own pixels of the divided pixels, Japanese Patent Application Laid-Open No. 2013-66140 does not discuss performing weighted addition on signals read out from adjacent pixels in a case where the signals of adjacent pixels are added and subjected to 2×2 compression or the like. In a case where photoelectric conversion signals are added without being weighted, there is the problem that in some cases image output at a high frame rate in which there is little generation of a false color at an edge portion in the images cannot be obtained.

SUMMARY OF THE INVENTION

One aspect of the present invention is a solid state imaging apparatus, including: a pixel array in which pixels having color filters are arrayed in a matrix shape in accordance with a predetermined color arrangement, with each pixel including a plurality of divided pixels having a color filter of a same color; and an adding circuit that performs addition averaging of a plurality of signals output from the divided pixels that comprise a plurality of pixels having color filters of a same color, wherein, among the plurality of pixels that are an object of the addition averaging, a number of signals output from the respective divided pixels of which the adding circuit performs addition averaging is different for at least one pixel relative to other pixels.

Further features of the present invention will become apparent from the following description of exemplary embodiments with reference to the attached drawings.

BRIEF DESCRIPTION OF THE DRAWINGS

FIG. 6A is a view illustrating weighted addition averaging of color signals in a column direction and a row direction according to the first embodiment of the present invention.

FIG. 6B is a view illustrating weighted addition averaging of color signals in a column direction and a row direction according to the first embodiment of the present invention.

FIG. 6C is a view illustrating weighted addition averaging of color signals in a column direction and a row direction according to the first embodiment of the present invention.

FIG. 6D is a view illustrating weighted addition averaging of color signals in a column direction and a row direction according to the first embodiment of the present invention.

DESCRIPTION OF THE EMBODIMENTS

Figure 1:
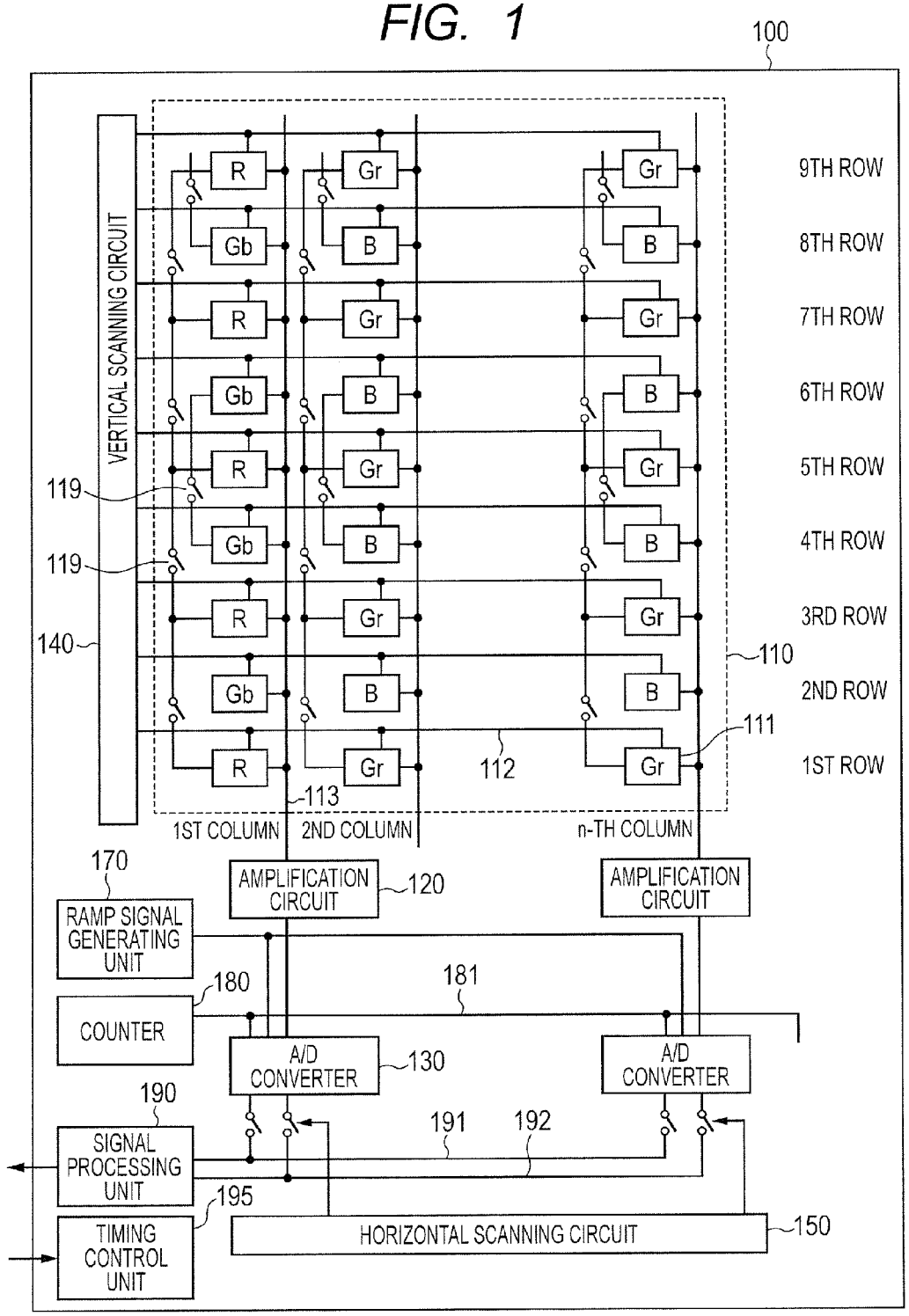
FIG. 1 is a view illustrating a schematic configuration of a solid state imaging apparatus according to a first embodiment of the present invention.

Preferred embodiments of the present invention will now be described in detail in accordance with the accompanying drawings. Like reference characters are assigned to like components throughout the drawings, and a description of duplicate components is omitted. Further, hereunder, "addition" and "averaging" are referred to collectively as "addition averaging".

First Embodiment

FIG. 1 is a view illustrating a schematic configuration of a solid state imaging apparatus 100 according to a first embodiment of the present invention. The solid state imaging apparatus 100 according to the present embodiment is, for example, a CMOS image sensor, and is an apparatus that performs imaging of a subject by performing photoelectric conversion of incident light that represents an image of the subject, and outputs an electrical signal obtained by the photoelectric conversion to the outside as digital data. The solid state imaging apparatus 100 includes a pixel array 110, an amplification circuit 120, an A/D (analog-to-digital) converter 130, a vertical scanning circuit 140, a horizontal scanning circuit 150, a ramp signal generating unit 170, a counter 180, a signal processing unit 190 and a timing control unit 195.

The pixel array 110 includes a plurality of pixels 111 arranged in a matrix shape, row selection lines 112 that are made common for each row of the pixels 111, column signal lines 113 that are made common for each column of the pixels 111, and column-direction addition averaging switches 119. Each pixel 111 includes a photoelectric conversion element such as a photodiode, and performs photoelectric conversion of light that is incident on the solid state imaging apparatus 100. A color filter that selectively transmits incident light of a predetermined wavelength is arranged on the photoelectric conversion element of the respective pixels. An R, Gr, Gb, or B symbol of the respective pixels 111 shown in FIG. 1 indicates that a red, green, green or blue color filter is arranged on the corresponding pixel 111, respectively. The color arrangement of color filters in the present embodiment is a Bayer arrangement, in which color filters are repeatedly arrayed in a manner which takes 2×2 pixels as one unit.

Each pixel 111 is connected to a row selection line 112 and a column signal line 113. Each row selection line 112 is connected to the vertical scanning circuit 140. Each column signal line 113 is connected to an amplification circuit 120.

The column-direction addition averaging switches 119 are arranged between wires that connect the pixels 111 that have color filters of the same color. When the column-direction addition averaging switches 119 are turned on, signals output from a plurality of pixels 111 of the same color that are aligned in the column (vertical) direction are addition-averaged. Accordingly, the column-direction addition averaging switches 119 function as a first adding circuit that performs addition averaging of signals of the pixel 111 in the column (vertical) direction.

Note that, in the description of the present embodiment, columns of the pixel array 110 are designated as a 1st column, a 2nd column, . . . an n-th column in order from the left side in the drawings, and rows of the pixel array 110 are designated as a 1st row, a 2nd row, . . . a 9th row in order from the lower side in the drawings. One part of the pixel array 110 is extracted and illustrated as an example for the drawings and the description of the present specification, and the entire pixel array 110 is not illustrated and described. Further, although in the drawings and the description of the present specification the rows and columns of the pixel array 110 are identified by terms such as "1st row", "even-numbered rows" and "odd-numbered rows", these terms are used for convenience to indicate positions in the drawings for the purpose of description, and are not intended to specify specific positions in the actual pixel array 110.

The vertical scanning circuit 140 sequentially supplies driving pulse signals to the row selection lines 112 that are arranged for each pixel rows. Upon the driving pulse signals being supplied to the row selection lines 112, electric charges that were subjected to photoelectric conversion are read out to the respective column signal lines 113 as analog voltage signals from the respective pixels 111 included in the corresponding pixel rows. In the solid state imaging apparatus 100 of the present embodiment, a noise signal that is a reset level signal of the pixel 111, and a pixel signal that is a signal obtained by superimposing the noise signal on a signal that depends on the generated amount of an electric charge generated by photoelectric conversion are read out as the analog signals from the pixel array 110. The noise signal is eliminated by subtracting the voltage of the noise signal from the voltage of the pixel signal, and thus a voltage value can be obtained that corresponds to the electric charge generated by photoelectric conversion.

An input terminal of each amplification circuit 120 is connected to the respective column signal lines 113, and an output terminal of each amplification circuit 120 is connected to the respective A/D converters 130. The amplification circuits 120 amplify analog signals that were input from the pixels 111 through the column signal lines 113, and output the amplified analog signals to the corresponding A/D converters 130.

The ramp signal generating unit 170 generates a ramp signal Vramp having a waveform in which the voltage changes monotonously, such as a sawtooth wave, and outputs the ramp signal Vramp to each A/D converter 130 through a ramp signal line 171.

The counter 180 outputs a count value Cnt though a count data line 181 to each A/D converter 130. The counter 180 is a circuit that outputs a count value that changes with time. For example, a Gray counter that outputs a Gray code or a binary counter that outputs a binary number can be used as the counter 180. Further, the counter 180 may be equipped with an increment/decrement function, that is, a function that switches between raising and lowering a count value.

The A/D converter 130 compares the voltage of a noise signal or a pixel signal that is input from the amplification circuit 120 with the voltage of the ramp signal that is input from the ramp signal generating unit 170. The A/D converter 130 converts the noise signal or the pixel signal from analog data to digital data by adopting as an output value a count value that is output from the counter 180 at a time point at which the magnitude relationship between the voltages is inverted therein.

Although in the present embodiment the plurality of A/D converters 130 share the ramp signal generating unit 170 and the counter 180, a configuration may also be adopted in which these components are individually provided for each A/D converter 130.

The horizontal scanning circuit 150 transfers the digital data that is output from the A/D converter 130 to digital signal lines 191 and 192 for each column. Digital data representing a noise signal is transferred to the digital signal line 191 and digital data representing a pixel signal is transferred to the digital signal line 192, and the respective items of digital data are input to the signal processing unit 190. The signal processing unit 190 subtracts the digital data representing the noise signal from the digital data representing the pixel signal, and outputs a value corresponding to the electric charge generated by photoelectric conversion to outside the solid state imaging apparatus 100.

The timing control unit 195 supplies pulse signals to each of the above described components to control the operation of the solid state imaging apparatus 100. The sending of pulse signals to the respective components from the timing control unit 195 is performed through signal lines (not shown in the drawings).

In the present embodiment, because the solid state imaging apparatus 100 includes the amplification circuits 120, pixel signals and the like are input to the A/D converters 130 after being amplified. Accordingly, the influence of noise that is generated at the A/D converters 130 is reduced. However, a configuration may also be adopted in which, by omitting the amplification circuits 120 of the solid state imaging apparatus 100, the analog signals from the pixels 111 are supplied directly to the A/D converters 130 via the column signal lines 113. In this case, the number of elements can be reduced in comparison to the above described configuration that includes the amplification circuits 120.

Further, in the example illustrated in FIG. 1, the amplification circuits 120, the A/D converters 130 and the horizontal scanning circuit 150 are illustrated as being arranged on one side of the pixel array 110. However, a configuration may also be adopted in which these components are arranged on both sides of the pixel array 110, and are allocated to components on either one of the sides for each pixel column. By adopting this configuration, the scanning speed can be increased relative to the above described embodiment.

Figure 2:
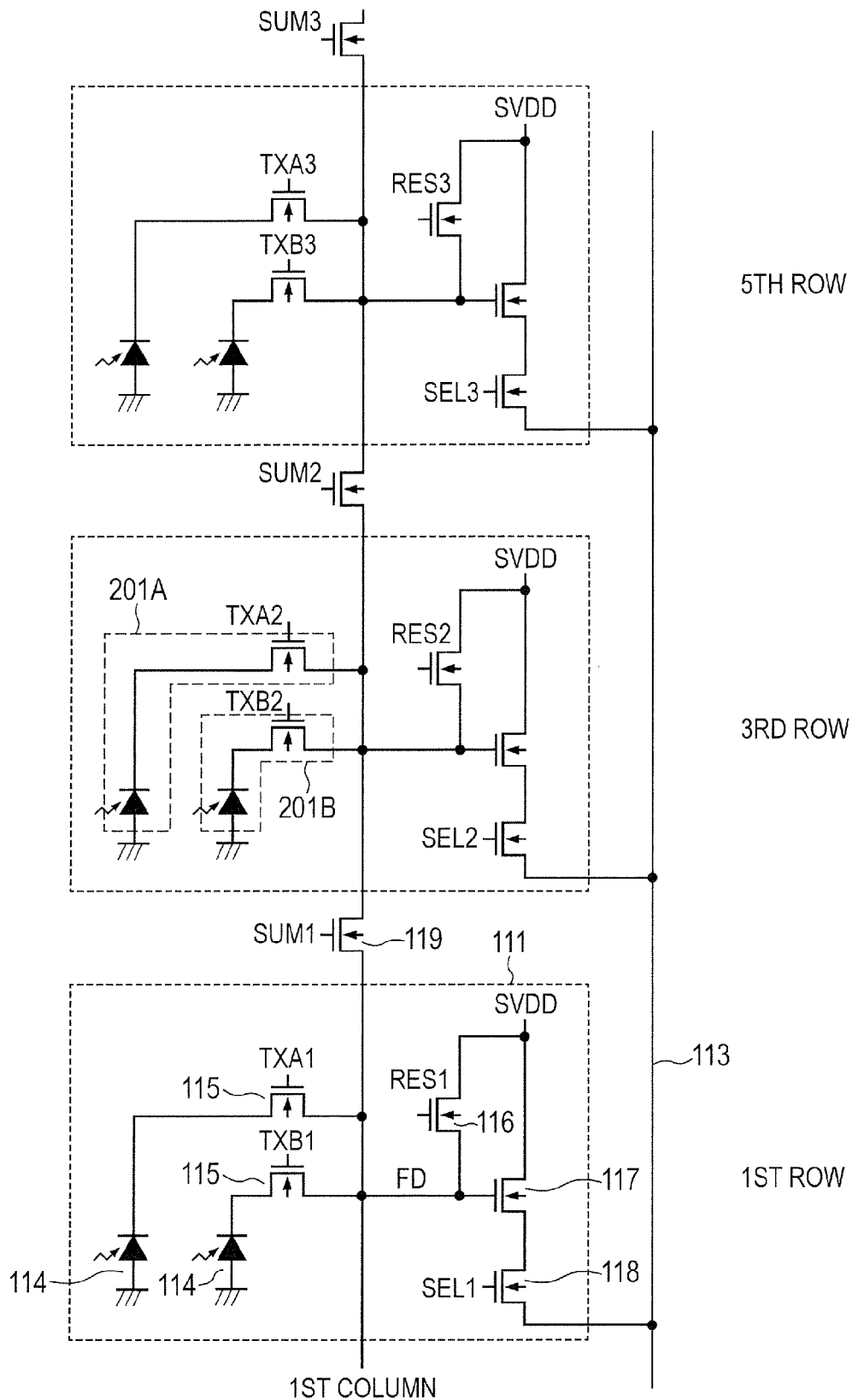
FIG. 2 is a view illustrating an equivalent circuit of pixels according to the first embodiment of the present invention.

FIG. 2 is a view that illustrates an equivalent circuit of the pixels 111. FIG. 2 illustrates an equivalent circuit for a case where the pixels 111 corresponding to one column of the 1st row, 3rd row and 5th row of the pixel array 110 shown in FIG. 1 are extracted. Each pixel 111 includes photodiodes 114 that perform photoelectric conversion and a plurality of transistors. The plurality of transistors includes a transfer switch 115, a reset switch 116, an amplification transistor 117 and a row selection switch 118. The plurality of transistors has a switching function and an amplification function for outputting electric charges generated by the photodiodes to the column signal line 113 as analog signals. The transfer switch 115, reset switch 116, amplification transistor 117 and row selection switch 118 are constituted by transistors such as, for example, N-channel-type field effect transistors. A floating diffusion region FD for detecting a retained electric charge is formed between the transfer switch 115, the reset switch 116 and the amplification transistor 117.

Note that, the separate use of the terms "switch" and "transistor" is to show that the respective transistors are mainly utilized for either one of a switching function and an amplification function, and thereby facilitate understanding of the circuit operations. The separate use of the terms "switch" and "transistor" is not intended to limit the structure of the elements.

The photodiodes 114 are connected to the floating diffusion region FD through the transfer switches 115. The floating diffusion region FD is in turn connected to a voltage source SVDD through the reset switch 116, and is also connected to a gate electrode of the amplification transistor 117. A first main electrode of the amplification transistor 117 is connected to the voltage source SVDD, and a second main electrode of the amplification transistor 117 is connected to the column signal line 113 through the row selection switch 118.

A gate electrode of the row selection switch 118 is connected to a row selection line PSEL (not shown) that is one of a plurality of row control lines 112 and that transmits a signal for selecting a row from which to read out signals. A gate electrode of the reset switch 116 is connected to a reset line PRES (not shown) that is one of the row control lines 112 and that transmits a reset signal. A gate electrode of the transfer switch 115 is connected to a transmission line PTX (not shown) that is one of the row control lines 112 and that transmits a signal for transmitting an electric charge that is generated at the photodiode 114.

In the present embodiment, in each pixel 111, two of the photodiodes 114 are provided and two transfer switches 115 are connected to the two photodiodes 114, respectively. Consequently, photocharges generated at the respective photodiodes 114 are selectively transferred to the floating diffusion region FD.

Each photodiode independently accumulates a photocharge, and each transfer switch 115 can independently transfer a photocharge. The respective pixels 111 of the present embodiment include two sets of the photodiode 114 and the transfer switch 115. That is, each pixel 111 includes, as subunits, divided pixels 201A and 201B that respectively include the photodiode 114 and the transfer switch 115.

The column-direction addition averaging switches 119 for connecting a plurality of the floating diffusion regions FD of a plurality of the pixels 111 and for addition averaging electric charges are provided between the pixels 111 of the same color that are adjacent in the longitudinal direction.

By opening/closing the transfer switches 115, photocharges are transferred to the plurality of floating diffusion regions FD that are connected through the column-direction addition averaging switches 119. Since the respective floating diffusion regions FD are connected, the transferred photocharges are distributed among the respective floating diffusion regions FD and become the same voltage. That is, the electric charges transferred to the respective floating diffusion regions FD are addition-averaged. Thus, the column-direction addition averaging switches 119 function as a first adding circuit that performs addition averaging of signals of the pixels 111 in the column (vertical) direction. Noise signals in pixel signals can be reduced by addition averaging the signals as described above.

Furthermore, since addition averaging enables compression of the number of outputs that are read out for a single frame, a high frame rate can be achieved. For example, in a case where 2×2 pixels in the vertical and horizontal directions are addition-averaged, the 4K2K format can be converted to the HD format and the frame rate can be improved.

For example, in FIG. 1, Gb pixels and B pixels that are two pixels in the column (vertical) direction that are arranged in the 4th row and 6th row are addition-averaged using a weighting of 1:1, respectively. Then, three R pixels and three Gr pixels that are arranged in the 1st row, 3rd row and 5th row that are adjacent in the column direction are addition-averaged using a weighting of 1:2:1, respectively. That is, the number of signals that are output and added from the respective divided pixels varies according to the respective pixels that are the objects of the addition averaging. As a result, weighted center positions of pixels included in the output signals after addition averaging are aligned at an equal pitch (two-pixel pitch), and therefore defects such as false colors which is unnatural coloring appearing at edge portions of subjects in images obtained by imaging can be avoided, and favorable images are obtained. Note that the number of pixels and the weights thereof used in addition averaging is not limited to those described in the foregoing. Further, as used in the present specification, the term "weighted center position" of a signal obtained by weighted averaging refers to an address obtained by subjecting the addresses of signals used in the weighted averaging to weighted averaging using the same ratio. For example, if the address of a signal X is taken as $(X_1, X_2)$, and the address of a signal Y is taken as $(Y_1, Y_2)$, the weighted center position of an averaged signal of the signal X and the signal Y that were averaged at a ratio of 1:2 is $((X_1+2Y_1)/3, (X_2+2Y_2)/3)$.

Figure 3:
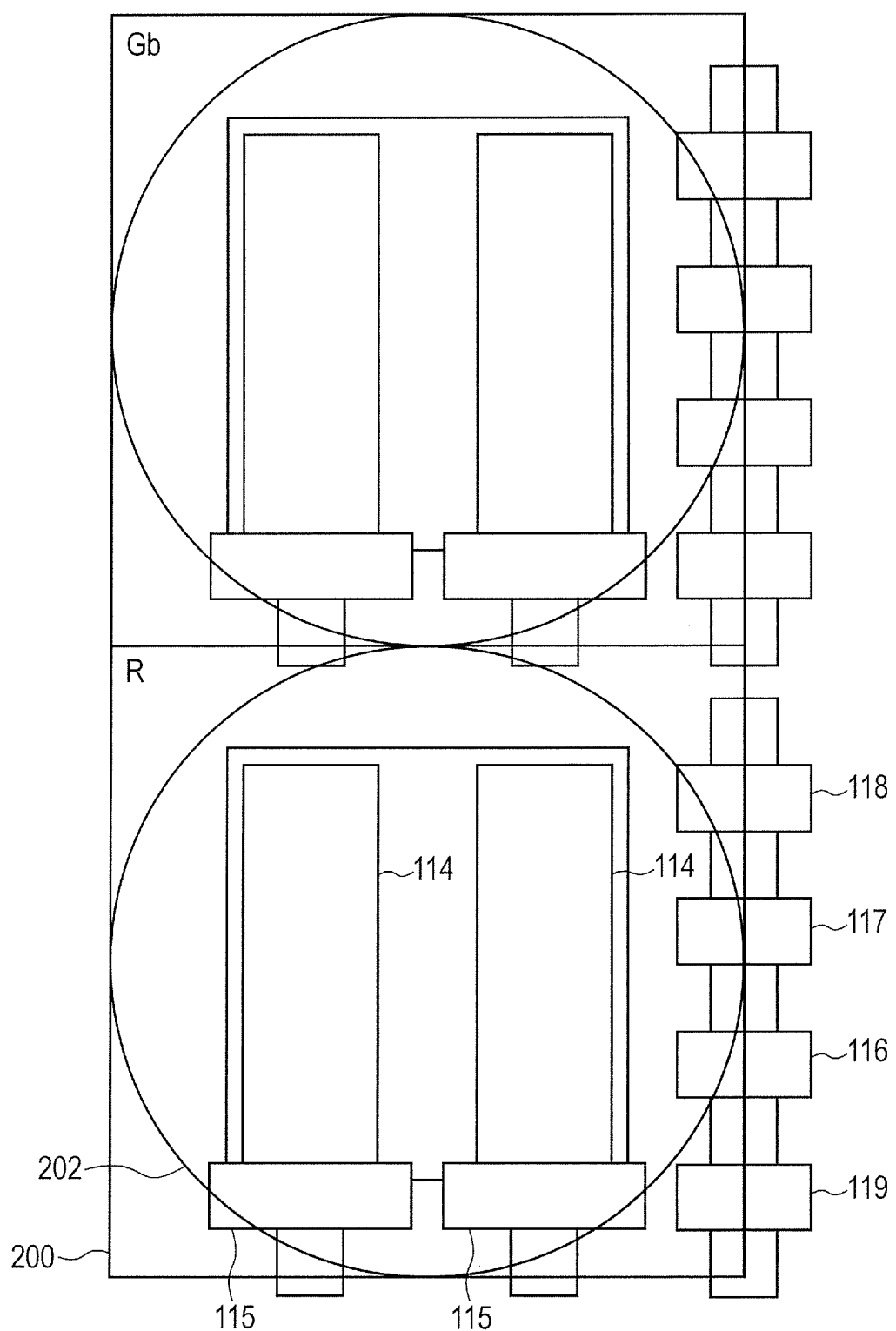
FIG. 3 is a view illustrating an element structure of pixels according to the first embodiment of the present invention.

FIG. 3 is a plan view illustrating the element structure of the pixel 111. The two photodiodes 114 are covered with a color filter 200 of the same color. Further, a microlens 202 as an optical system having a light-condensing function is arranged on the pixel. The two divided pixels 201A and 201B share the same microlens 202. The center of the microlens is positioned halfway or approximately halfway between the two divided pixels, and the respective incident angle dependences of the light detection sensitivity of the two divided pixels shown in FIG. 3 are different. Distance information with respect to a subject can be obtained by utilizing the aforementioned difference between the incident angle dependences and, for example, can be utilized for a function such as autofocus.

Figure 4:
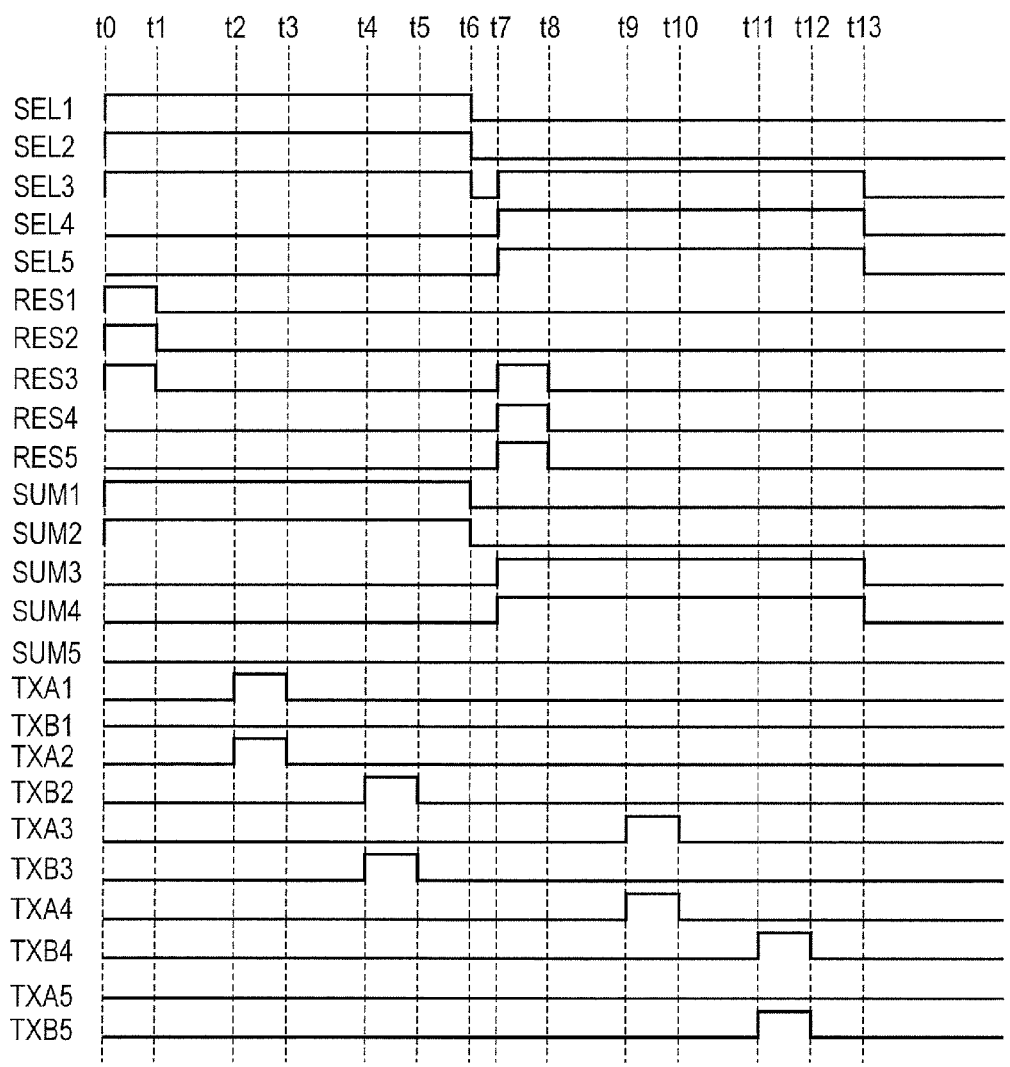
FIG. 4 is a drive timing chart illustrating an operation to read out pixel signals according to the first embodiment of the present invention.

FIG. 4 is a drive timing chart that illustrates an operation to read out pixel signals of the pixels 111.

In the read-out operation illustrated in FIG. 4, the pixels 111 of the same color in the column direction are weighted-addition-averaged at a ratio of 1:2:1. That is, among the pixels in the 1st row, 3rd row and 5th row of the pixel array 110 shown in FIG. 1, the R pixels are weighted-addition-averaged with respect to each other, and the Gr pixels are weighted-addition-averaged with respect to each other, and next the pixels in the 5th row, 7th row and 9th row are weighted-addition-averaged in the same manner. In this manner, the number of pixel outputs in the vertical direction can be compressed to ½ and read out. The drive timing chart illustrated in FIG. 4 is a chart for performing weighted addition averaging of the pixels of the 1st row, 3rd row and 5th row.

The drive timing shown in FIG. 4 will now be described in chronological order. Note that in the description of the present specification it is assumed that in each transistor (switch), the source electrode and the drain electrode enter a conductive state ("on" state) when a signal voltage that is input to the gate electrode is a "high" level.

First, at a time t0, row selection signals SEL1, SEL2 and SEL3 for the 1st row, 3rd row and 5th row become a "high" level, and the respective amplification transistors 117 enter an "on" state. At this time, the amplification transistors 117 of the corresponding three rows are connected to the column signal line 113, and each operate as a source follower circuit. That is, a voltage corresponding to the potential of the floating diffusion region FD is output to the column signal line 113. At the same time t0, reset signals RES1, RES2 and RES3 become a "high" level, and the respective reset switches are turned on. The potentials of the floating diffusion regions FD of the three rows are reset to the potential of the voltage source SVDD through the reset transistor 116. In addition, at the same time t0, control signals SUM1 and SUM2 of the respective column-direction addition averaging switches 119 become a "high" level, and the respective column-direction addition averaging switches 119 are turned on. This state continues until a time t6. That is, until the time t6 at which the series of read-out operations ends, the respective floating diffusion regions FD of the 1st row, 3rd row and 5th row are electrically connected and become the same potential.

At a time t1, the reset signals RES1, RES2 and RES3 become a "low" level, and the respective reset transistors 116 enter an "off" state. At this time, the voltages of the floating diffusion regions FD of the three rows are the reset voltage, that is, the potential of the voltage source SVDD. Accordingly, a signal that is output from the respective amplification transistors 117 to the column signal line 113 is a voltage signal at a time that an electric charge is not being transferred from the respective photodiodes 114, that is, a noise signal. Here, this signal is referred to as an "N signal". After the N signal is amplified at the relevant amplification circuit 120, the amplified signal is converted to a digital signal at the A/D converter 130.

Next, during a period from a time t2 to a time t3, transfer signals TXA1 and TXA2 become a "high" level, and signals of the divided pixels 201A of the 1st row and 3rd row are read out through the transfer transistors 115 and are addition-averaged on the floating diffusion regions FD. The resulting signal is output to the column signal line 113 through the amplification transistor 117. An output signal from the column signal line 113 during the period between the times t2 and t3 is a signal that corresponds to a voltage obtained by superimposing the photocharge of the divided pixel A on the aforementioned N signal. Here, this is referred to as an "N+A signal". Similarly to the N signal, the N+A signal is amplified at the amplification circuit 120, and thereafter the amplified signal is converted to a digital signal at the A/D converter 130. That is, the voltage of the N+A signal corresponds to a voltage obtained by performing addition averaging of electric charges that output from the divided pixels 201A of the 1st row and the divided pixels 201A of the 3rd row on the floating diffusion region FD.

Next, during a period from a time t4 to a time t5, transfer signals TXB2 and TXB3 become a "high" level, and signals of the divided pixels 201B of the 3rd row and 5th row are read out through the transfer transistors 115 and are addition-averaged in a similar manner on the floating diffusion regions FD. At this time, a voltage is output that corresponds to a signal obtained by superimposing a signal obtained based on the photocharge output from the divided pixels 201B on the above described A+N signal. Here, this is referred to as an "N+A+B signal". Similarly to the N signal and the N+A signal, the N+A+B signal is amplified at the amplification circuit 120, and thereafter the amplified signal is converted to a digital signal at the A/D converter 130.

Next, at the time t6, the SEL1, SEL2, SEL3, SUM1 and SUM2 signals become a "low" level, the row selection switch 118 and the column-direction addition averaging switch 119 all enter an "off" state, and the series of read-out operations ends.

Subsequently, during a period from a time t7 to a time t13, similar operations to those described above are repeated for the 5th row, 7th row and 9th row.

An electric charge that contributes to the N+A+B signal is an electric charge obtained by adding together the electric charge from the divided pixel 201A of the 1st row, the electric charges from the divided pixels 201A and 201B of the 3rd row, and the electric charge from the divided pixel 201B of the 5th row. That is, the number of divided pixels that contribute to addition averaging in the respective rows is 1:2:1.

As described above, an operation to read out the electric charges from the divided pixels 201A and 201B in the 3rd row is divided into two read-out operations. In the first read-out operation (from time t2 to t3) a signal is read out from the divided pixel 201A, and in the second read-out operation (from time t4 to t5) a signal is read out from the divided pixel 201B. Consequently, the charges that are read out as signals in the first read-out operation and the second read-out operation are charges that were generated from respectively different photodiodes 114. That is, the relative positions of the divided pixels inside the relevant pixels differ depending on the plurality of pixels that are the objects of the addition averaging. It is thereby possible to perform an operation to read out signals two times from the same pixel without reading out electric charges from the same photodiode, and 1:2:1 weighted addition averaging is realized.

In a case where only averaging is performed without performing weighted addition, the weighted center positions of pixels for which the averaging is performed (weighted center positions of addresses of pixels included in the addition-averaged signal) do not become an equal pitch. In contrast, by combining the above described 1:2:1 weighted averaging and the 1:1 addition averaging of pixels of the 4th row and 6th row, the weighted center positions of the addition-averaged pixels become an equal pitch. As a result, by using the solid state imaging apparatus 100 of the present embodiment, an imaging system such as a scanner, a digital video camera or a digital still camera can be realized in which unnatural coloring (a false color) that is conspicuous at an edge portion of a subject is reduced compared to the conventional technology.

The divided pixels from which signals are read out in the 1st row and the 5th row are the divided pixel 201A and the divided pixel 201B, respectively. That is, with respect to the 1st row and the 5th row, electric charges are acquired from the photodiodes 114 whose positions differ from each other by an amount corresponding to half of the pitch in the column direction. The possibility that the image quality of an imaged image will be affected by the difference in the positions of the divided pixels will now be discussed.

In a case where a subject has no contrast pattern (striped pattern), it is considered that the two signals that are output from the divided pixels 201A and 201B will be equal. It is considered that the two signals will also be equal in a case where a subject has a contrast pattern in the row direction (horizontal stripe pattern).

In a case where a subject has a contrast pattern in the column direction (vertical stripe pattern) also, it is considered that as long the subject will not generate an image with an extremely fine resolution having a contrast that is close to the pixel pitch, the ratios of the output electric charge amounts of the divided pixels 201A and the divided pixels 201B of the 1st row, 3rd row and 5th row will be equal. Consequently, it is considered that there is a low possibility of unnatural coloring occurring even when a contrast pattern is imaged, and that the difference between the positions of the divided pixel 201A and the divided pixel 201B does not constitute a problem. Accordingly, it is considered that use of the present embodiment is advantageous in comparison to the conventional technology with respect to imaging a contrast pattern.

On the other hand, the signals of the divided pixel 201A and the divided pixel 201B can be acquired separately in order to obtain necessary distance information for optimizing the imaging conditions. By calculating a difference between the N signal and the N+A signal at the signal processing unit 190, a signal (A signal) that is acquired by addition averaging the output signals of the divided pixels 201A of two rows can be obtained. Furthermore, after obtaining an A+B signal by calculating a difference between the N signal and the N+A+B signal at the signal processing unit 190, a signal (B signal) acquired by addition averaging the output signals of the divided pixels 201B of two rows can be obtained by further subtracting the addition-averaged signal of the A signal acquired by the above described method. Since the S/N (signal-to-noise) ratio is improved by the addition averaging with respect to the A signal and the B signal calculated in the above manner, highly accurate distance information can be obtained and stabler autofocusing can be executed.

It is favorable to use this method for autofocusing by a phase difference detection method. In the present embodiment, distance information can be acquired by detecting a slight deviation between moderate shading that is acquired with a signal group of the divided pixels 201A that straddles a plurality of pixels and moderate shading that is acquired with a signal group of the divided pixels 201B as a phase difference in the positional direction. Because the S/N ratio of the A signal and the B signal is improved for the reason described above, autofocusing is stabilized by employing this method.

In the present embodiment, since photodiodes are separated in the row (horizontal) direction, phase difference detection can be performed even more effectively in an imaging scene in which a luminance difference arises in the row direction. On the other hand, weighted addition averaging of signals is performed in the column direction. Therefore, the S/N ratio can be improved without losing the spatial resolution by performing addition averaging.

Figure 5:
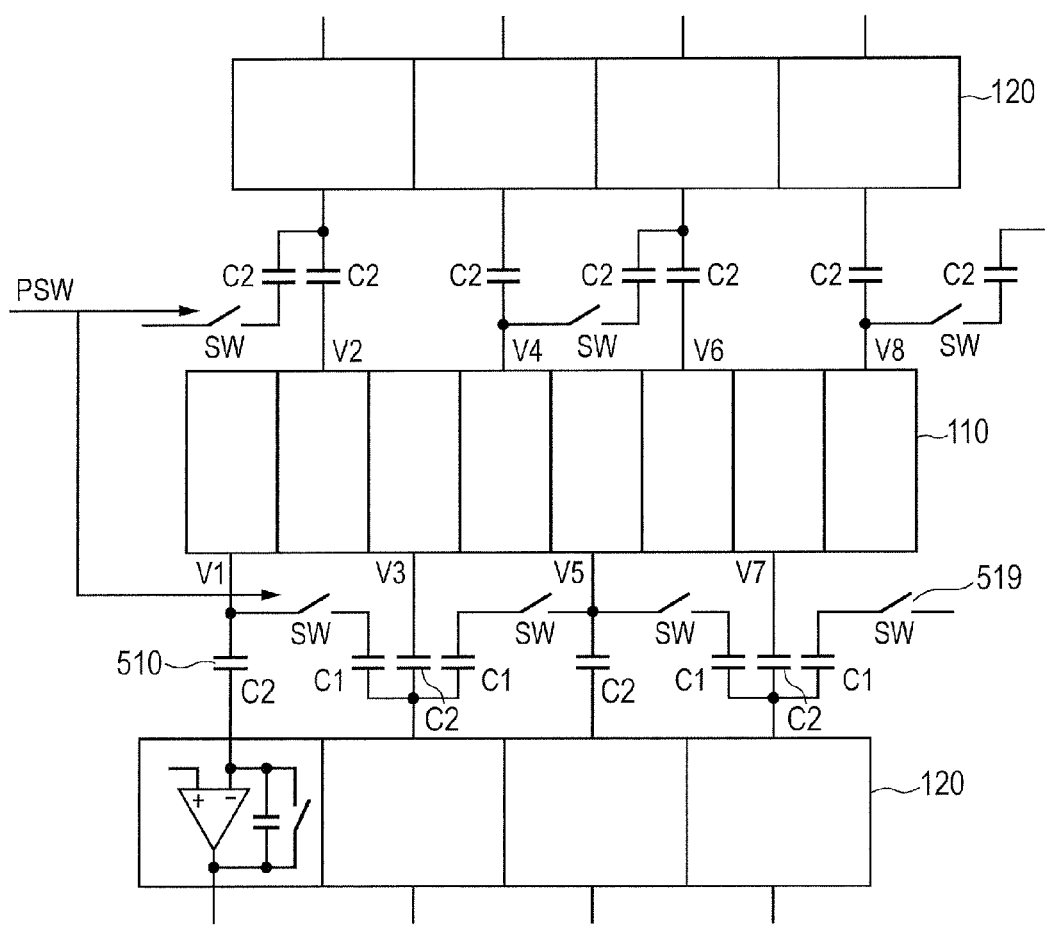
FIG. 5 is a view illustrating a circuit for performing weighted addition averaging in a row direction according to the first embodiment of the present invention.

Next, weighted addition averaging in the row (horizontal) direction will be described. FIG. 5 is a view that illustrates weighted addition averaging in the row (horizontal) direction of color signals from respective rows. Addition averaging is performed by means of a plurality of row-direction addition averaging switches 519 and a plurality of input capacitors 510 that are arranged between the pixel array 110 and the amplification circuits 120. The plurality of row-direction addition averaging switches 519 are each individually controlled to turn on or off by a drive signal PSW from the timing control unit 195. The pixel signals that are read out to the column signal lines 113 from the pixels 111 of each row of the pixel arrays 110 are input to the amplification circuits 120 through the plurality of input capacitors 510. The respective output voltages of eight pixel arrays 110 that are partially illustrated in FIG. 5 will be referred to here as V1, V2 . . . V8.

In FIG. 5, signals that are output from pixels of odd-numbered columns (R or Gb) are illustrated as being input to amplification circuits 120 provided downward of the pixel arrays 110, while signals that are output from pixels of even-numbered columns (Gr or B) are illustrated as being input to amplification circuits 120 provided upward of the pixel arrays 110. However, the purpose of illustrating odd-numbered columns and even-numbered columns separately in this manner in the drawings is to facilitate understanding of addition averaging operations at the adding circuits, and the arrangement of the columns on the actual circuit may differ from FIG. 5. For example, column signal lines may be led-out in one direction without being separated into odd-numbered columns and even-numbered columns in the upward and downward directions.

The plurality of input capacitors 510 include capacitors (hereunder, referred to as "capacitor C1") having a capacitance value C1 and capacitors (hereunder, referred to as "capacitor C2") having a capacitance value C2. An n-th pixel column of the pixel array 110 is connected to the amplification circuit 120 of the n-th column through the capacitor C2.

For example, the pixels 111 of the 1st column are connected to the amplification circuit 120 of the 3rd column through the row-direction addition averaging switch 519 and the capacitor C1. The amplification circuit 120 of the 3rd column is connected to the pixels 111 of the 5th column through the row-direction addition averaging switch 519 and the capacitor C1. The same also applies with respect to the pixels thereafter. That is, with respect to the odd-numbered columns, the pixels of the 4n−1th column are connected through the capacitor C2 to the amplification circuit of the 4n−1th column and, in addition, the pixels of the 4n−3th column and the 4n+1th column are also connected to the amplification circuit of the 4n−1th column through the row-direction addition averaging switch 519 and the capacitor C1.

On the other hand, a different method is used to connect pixels of even-numbered columns. For example, the amplification circuit of the 6th column is connected to the pixels of the 4th column through the row-direction addition averaging switch 519 and the capacitor C2. That is, in the even-numbered columns, with respect to the amplification circuit of the 4n+2th column, pixels of the 4n+2th column are connected thereto through the capacitor C2 and, in addition, the pixels of the 4n-th column are also connected thereto through the row-direction addition averaging switch 519 and the capacitor C2.

By adopting this circuit configuration, addition averaging of pixel signals is realized. In the present embodiment, as one example, it is assumed that the capacitance value of the capacitor C1 is ½ of the capacitance value of the capacitor C2. When the row-direction addition averaging switch 519 is turned on by the drive signal PSW, voltages are averaged in accordance with the ratio between the capacitance values. Hence, a voltage applied to the amplification circuit 120 of the 3rd column becomes (V1+2×V3+V5)/4, and a voltage applied to the amplification circuit 120 of the 6th column becomes (V4+V6)/2. That is, pixel signals of the 1st column, 3rd column and 5th column of the odd-numbered columns are subjected to addition averaging at the ratio 1:2:1, and pixel signals of the 4th column and 6th column of the even-numbered columns are subjected to addition averaging at the ratio 1:1. Thus, the row-direction addition averaging switch 519 and the input capacitor 510 function as a second adding circuit that performs addition averaging of the signals from the pixels 111 in the row (horizontal) direction.

Note that, in a case where the row-direction addition averaging switch 519 is "off", the circuit functions as a circuit that reads out the color signals from all the pixels as they are without performing addition averaging. Thus, it is also possible to output the output signals of the respective pixels without performing weighted addition averaging.

Although a method has been described that performs addition averaging of signals by means of input capacitors of amplification circuits, a configuration may also be adopted in which, by providing a circuit that performs addition averaging at a subsequent stage after the A/D conversion circuit, data that has undergone A/D conversion is addition-averaged.

The weighted addition averaging in the column (vertical) direction and row (horizontal) direction that has been described in the foregoing will now be described in summary form from the viewpoint of pixel addresses. FIGS. 6A to 6D are views that illustrate weighted addition averaging of color signals in the column direction and row direction.

FIG. 6A is a view illustrating the arrangement of color filters of respective pixels, that is, an array of color signals obtained from the respective pixels. The characters R, Gb, Gr and B in FIG. 6A correspond to color signals for red, green, green and blue, respectively. Further, the numerical values in the vertical direction represent address numbers of the respective lines, and the numerical values in the horizontal direction represent address numbers of the respective columns. The positions of the respective pixels as well as a color signal obtained from the relevant pixel can be specified by specifying the address number of the relevant row and column. Hereunder, color signals may also be represented in the form of, for example, R(31) that indicates a color signal for R obtained from a pixel arranged in the first column of the third row.

The symbols additionally described at the margins in FIG. 6A represent ratios with respect to addition averaging of pixel signals in the vertical direction that is described above. That is, within each column, 1:2:1 addition averaging is performed with respect to color signals of the 1st row, 3rd row and 5th row of the odd-numbered rows. Further, it is illustrated that, next, 1:2:1 addition averaging is also performed with respect to color signals of the 5th row, 7th row and 9th row. In this case, a signal corresponding to "1" in the ratio 1:2:1 is one of the A signal and the B signal, and a signal corresponding to "2" is a signal obtained by adding the A signal and B signal. Further, for the even-numbered rows, 1:1 addition averaging is performed with respect to color signals of the 4th row and 6th row, and in this case a signal corresponding to "1" in the ratio 1:1 is a signal obtained by adding the A signal and B signal.

Subsequently, 1:1 addition averaging is performed with respect to color signals of the 8th row and 10th row.

Addition averaging performed in the horizontal direction is illustrated in FIG. 6B. The table in FIG. 6B illustrates a new array of color signals after the above described addition averaging in the vertical direction. For color signals in the horizontal direction also, similarly to the color signals in the vertical direction, 1:2:1 addition averaging is performed for the R signals and Gb signals of odd-numbered columns, and 1:1 addition averaging is performed for the Gr and B signals of the even-numbered columns.

FIG. 6C is a view that illustrates the spatial arrangement of color signals R(33), Gr(35), Gb(35) and B(55) after the color signals were addition-averaged in the vertical and horizontal directions, in correspondence with the row and column address numbers in FIG. 6A. The respective address numbers after addition averaging correspond to weighted center positions of the addresses of the original color signals used for the addition averaging. For example, in a case where the color signals of the 1st row, 3rd row and 5th row were addition-averaged using the ratio 1:2:1, and next the color signals of the 1st column, 3rd column and 5th column were addition-averaged using the ratio 1:2:1, the weighted center position thereof is (33), and therefore the color signal after the addition averaging is described as R(33). Thus, color signals are obtained in which the color signals in the vertical direction and horizontal direction of each pixel in FIG. 6A are compressed to ½, respectively. The arrangement of the color signals that contribute to addition averaging for the color signals R(33), Gr(35), Gb(35) and B(55) is illustrated in FIG. 6D.

The above-described addition averaging of the respective color signals is summarized and expressed using mathematical equations hereunder. In the following equations, $A_{mn}$ represents an A signal that is output from the pixel 111 at an address (m, n), and $B_{mn}$ represents a B signal that is output from the pixel 111 at the address (m, n).

$$\begin{aligned}
R(33) &= \text{(addition of 1st, 3rd and 5th row of 1st column)} + 2 \times \\
&\quad \text{(addition of 1st, 3rd and 5th row of 3rd column)} + \\
&\quad \text{(addition of 1st, 3rd and 5th row of 5th column)} \\
&= \{B_{11} + (A_{31} + B_{31}) + A_{51}\} + 2 \times \{B_{13} + (A_{33} + B_{33}) + A_{53}\} + \\
&\quad \{B_{15} + (A_{35} + B_{35}) + A_{55}\}
\end{aligned}$$

$$\begin{aligned}
Gr(35) &= \text{(addition of 1st, 3rd and 5th row of 4th column)} + \\
&\quad \text{(addition of 1st, 3rd and 5th row of 6th column)} \\
&= \{B_{14} + (A_{34} + B_{34}) + A_{54}\} + \{B_{16} + (A_{36} + B_{36}) + A_{56}\}
\end{aligned}$$

$$\begin{aligned}
Gb(53) &= \text{(addition of 4th and 6th row of 1st column)} + 2 \times \\
&\quad \text{(addition of 4th and 6th row of 3rd column)} + \\
&\quad \text{(addition of 4th and 6th row of 5th column)} \\
&= \{(A_{41} + B_{41}) + (A_{61} + B_{61})\} + 2 \times \{(A_{43} + B_{43}) + (A_{63} + B_{63})\} + \\
&\quad \{(A_{45} + B_{45}) + (A_{65} + B_{65})\}
\end{aligned}$$

$$\begin{aligned}
B(55) &= \text{(addition of 4th and 6th row of 4th column)} + \\
&\quad \text{(addition of 4th and 6th row of 6th column)} \\
&= \{(A_{44} + B_{44}) + (A_{64} + B_{64})\} + \{(A_{46} + B_{46}) + (A_{66} + B_{66})\}
\end{aligned}$$

As described above, according to the solid state imaging apparatus of the present embodiment, by performing weighted addition averaging of pixel signals, the weighted center positions of pixels for which addition averaging is performed can be controlled, and image output at a high frame rate in which there is little generation of a false color at an edge portion in the images is obtained. Further, it is possible to obtain signals in pre-addition divided pixel units during the reading out process. By using signals in pre-addition divided pixel units, phase difference information that has a high S/N ratio is obtained, and stable autofocusing that uses the phase difference information is enabled. Further, since signals of the divided pixels are addition-averaged, phase difference information with respect to a phase difference between divided pixels A and B does not remain in the N+A+B signal after addition. Consequently, the generation of unnatural images is avoided.

Second Embodiment

A solid state imaging apparatus according to the second embodiment of the present invention will be described in detail hereunder. The present embodiment differs from the first embodiment with respect to the configuration of the pixels and the configuration of the amplification circuits that are arranged for each column. Hence, only the configuration of the pixels and the configuration of the amplification circuits are described in detail hereunder.

Figure 7:
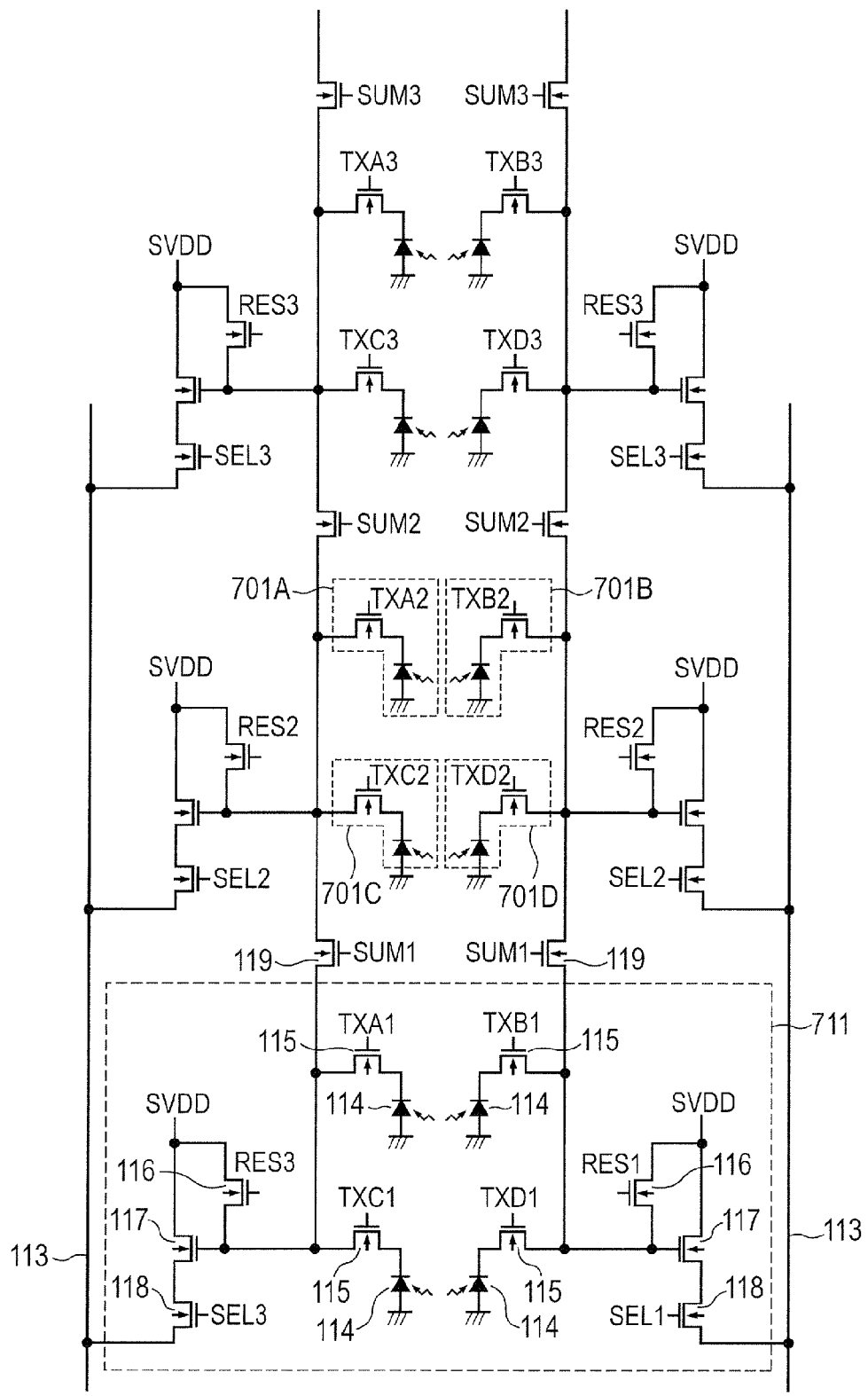
FIG. 7 is a view illustrating an equivalent circuit of pixels according to a second embodiment of the present invention.

FIG. 7 is a view that illustrates an equivalent circuit of a pixel 711 according to the second embodiment of the present invention. The pixel 711 is not divided in two parts, but rather is divided into four parts to include divided pixels 701A, 701B, 701C and 701D. In addition, two systems which respectively include one each of the reset switch 116, the amplification transistor 117 and the row selection switch 118 are provided for reading out signals from the divided pixels 701A to D. These points represent structural differences between the second embodiment and the above described first embodiment. The pixel 711 includes four of the photodiodes 114. Two photodiodes included in the divided pixels 701A and 701C are connected to the amplification transistor 117 through the transfer switch 115. Two photodiodes included in the divided pixels 701B and 701D are connected to the amplification transistor 117 through the transfer switch 115 of a different system.

Since the pixel 711 has two readout circuit systems, two column signal lines 113 are provided for a single pixel 711.

Addition of electric charges generated at photodiodes arranged within the same system can be performed within the pixel 711 and can also be performed between pixels that are connected through the addition averaging switch 119 in a similar manner to the first embodiment.

Figure 8:
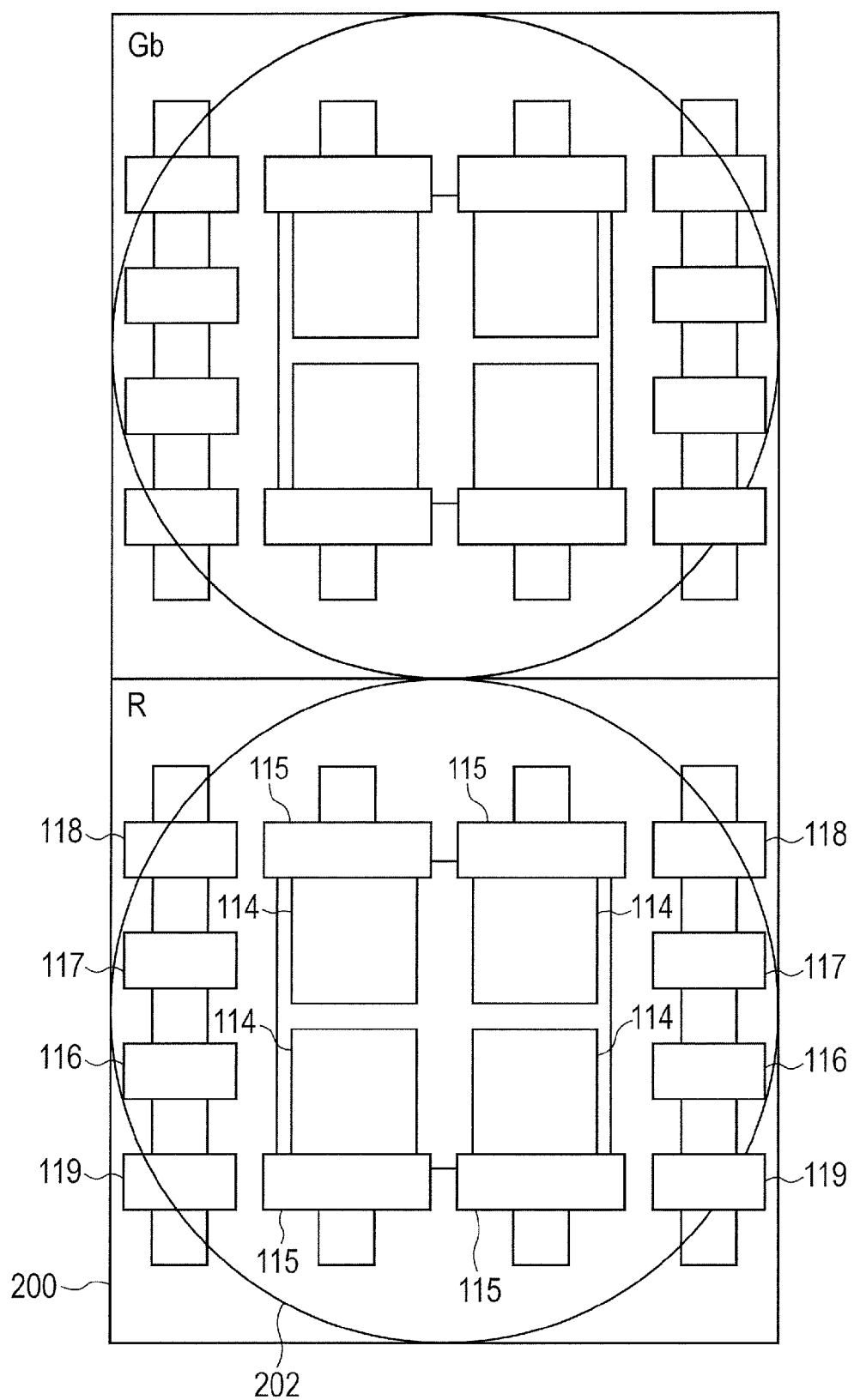
FIG. 8 is a view illustrating an element structure of pixels according to the second embodiment of the present invention.

FIG. 8 is a plan view illustrating the element structure of the pixel 711 according to the second embodiment of the present invention. The four photodiodes 114 included in the divided pixels obtained by dividing the pixel 711 into four parts share the color filter 200 of the same color and the same microlens 202.

Figure 9:
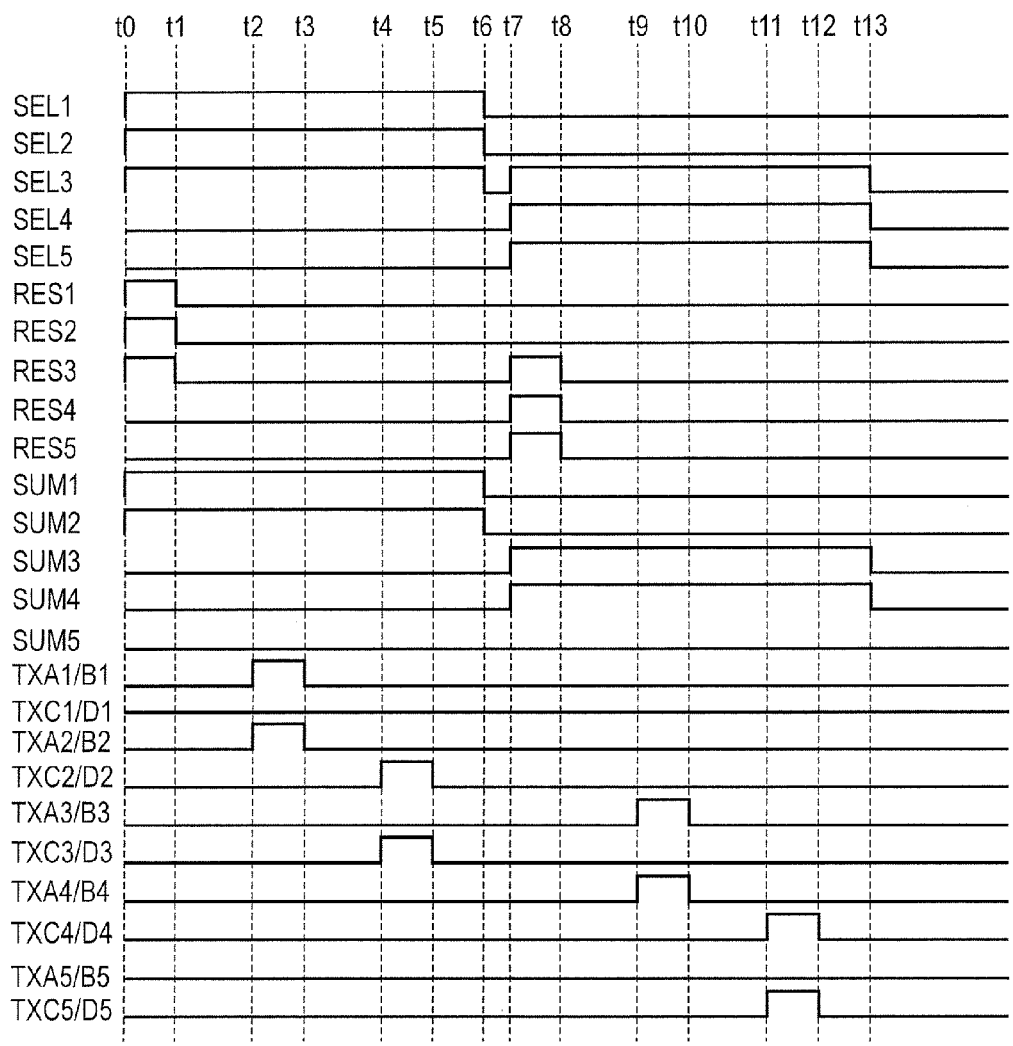
FIG. 9 is a first drive timing chart according to the second embodiment of the present invention.

FIG. 9 illustrates a first drive timing chart for obtaining addition signals of each pixel while acquiring phase difference signals between divided pixels arranged in the vertical direction from the four divided pixels. A difference between the drive timing chart illustrated in FIG. 9 and the drive timing chart according to the first embodiment illustrated in FIG. 4 is that the transfer signals TXA1 to 5 and TXB1 to 5 that control the transfer switches are replaced by transfer signals TXA1/B1 to A5/B5 and TXC1/D1 to C5/D5. Here, the reference characters "TXA1/B1" and the like mean that a signal is sent that turns both of the transfer switches "on" or "off". That is, the signals of the divided pixel 701A and the divided pixel 701B are transferred simultaneously, and the signals of the divided pixel 701C and the divided pixel 701D are also transferred simultaneously. Accordingly, if two pixels that operate based on signals that are simultaneously transferred are regarded as being identical, the pixels can be considered to be a pixel that is divided in two vertically. Therefore, since the major part of the operations are the same as those in the first embodiment, only operations that are characteristic features of the present embodiment will be described here. Note that, in the following description, signals that are output by the divided pixels 701A to D are referred to as A to D signals, respectively.

First, during a period from a time t2 to a time t3, signals are read out from the divided pixels 701A and 701B, and a N+A+B signal is acquired. During a period from a time t4 to a time t5, signals of the divided pixels 701C and 701D are output, and a N+A+B+C+D signal is acquired by superimposing the signals that were output from the divided pixels 701C and 701D on the N+A+B signal. Similarly to the first embodiment, a phase difference signal for a phase difference between divided pixels in the vertical direction is acquired. Simultaneously, similarly to the first embodiment, signals between pixels arranged in the vertical direction are addition-averaged in the floating diffusion regions, and signals between pixels arranged in the horizontal direction are addition-averaged using the ratio 1:2:1 in the amplification circuits 120.

Figure 10:
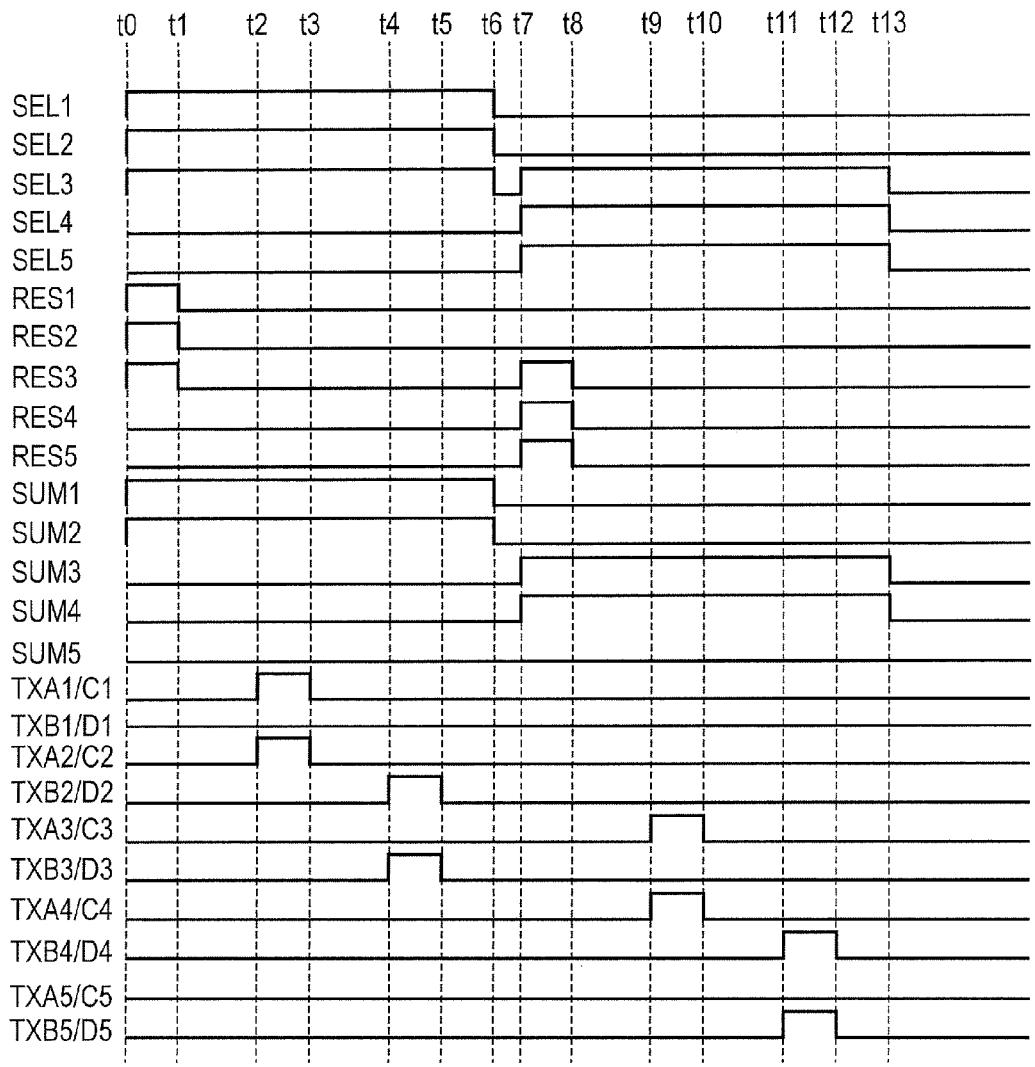
FIG. 10 is a second drive timing chart according to the second embodiment of the present invention.

FIG. 10 illustrates a second drive timing chart for obtaining addition signals of each pixel while acquiring phase difference signals between divided pixels arranged in the horizontal direction from the four divided pixels. A difference between the drive timing chart illustrated in FIG. 10 and the drive timing chart illustrated in FIG. 9 is that the transfer signals TXA1/B1 to A5/B5 and TXC1/D1 to C5/D5 that control the transfer switches are replaced by transfer signals TXA1/C1 to A5/C5 and TXB1/D1 to B5/D5. That is, the signals of the divided pixel 701A and the divided pixel 701C are transferred simultaneously, and the signals of the divided pixel 701B and the divided pixel 701D are also transferred simultaneously. Hence, the divided pixels can be considered to be a pixel that is divided in two horizontally. That is, a difference can also be considered to be that the methods of dividing in the horizontal direction and the vertical direction are interchanged relative to FIG. 9. Therefore, similarly, a weighted-addition-averaged output can be obtained simultaneously with a phase difference signal for the horizontal direction.

According to the solid state imaging apparatus of the present embodiment, by selectively setting either one of two kinds of drive timings that are illustrated in FIG. 9 and FIG. 10, 2×2 addition signals can be acquired while acquiring an arbitrary phase difference signal in the horizontal or vertical direction from the pixel 111 that includes four divided pixels.

Note that, although in the present embodiment the acquisition of a phase difference signal and the acquisition of an addition-averaged output are performed simultaneously, a configuration can also be adopted so as to output two kinds of outputs, namely, a low-sensitivity output for which signals of some of the divided pixels are read out, and an addition-averaged output for which signals of all the divided pixels are read out. By using these outputs in combination, the dynamic range of the photodetection can be expanded.

Third Embodiment

Figure 11:
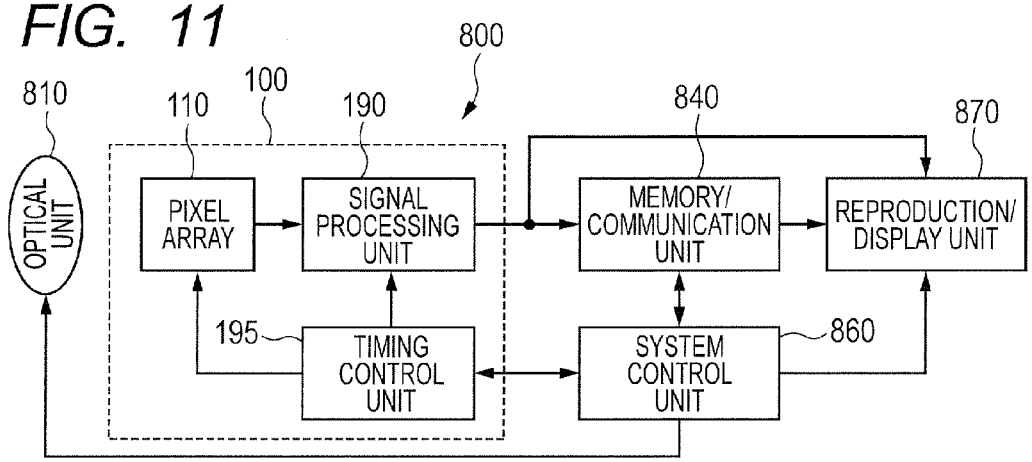
FIG. 11 is a view illustrating a configuration example of an imaging system according to a third embodiment of the present invention.

FIG. 11 is a view that illustrates the configuration of an imaging system that uses the solid state imaging apparatus according to the first or second embodiment of the present invention. An imaging system 800 includes the solid state imaging apparatus 100, an optical unit 810, a memory/communication unit 840, a system control unit 860 and a reproduction/display unit 870. As described above, the solid state imaging apparatus 100 includes the pixel array 110, the signal processing unit 190 and the timing control unit 195.

The optical unit 810 that is an optical system such as a lens causes imaging of light from a subject on the plurality of pixels 111 of the pixel array 110 to thereby form an image of the subject. At a timing that is based on a signal from the timing control unit 195, the pixel array 110 outputs signals that are in accordance with the light that was imaged on the pixels 111. The signals that are output from the pixel array 110 are subjected to processing such as A/D conversion or the like, and are thereafter input to the signal processing unit 190. The signal processing unit 190 performs signal processing such as conversion of the input signals to image data in accordance with a predetermined method by means of a program or the like. Signals that are obtained as a result of the processing at the signal processing unit 190 are sent to the memory/communication unit 840 as image data. The memory/communication unit 840 sends signals for forming an image to the reproduction/display unit 870, and allows the reproduction/display unit 870 to reproduce/display a moving image or a still image. Further, upon receiving the signals from the signal processing unit 190, the memory/communication unit 840 also carries out communication with the system control unit 860, and furthermore performs operations to cause the signals for forming images to be recorded on an unshown recording medium.

The system control unit 860 carries out unified control of the operations of the imaging system, and controls driving of the optical unit 810, the timing control unit 195, the memory/communication unit 840 and the reproduction/display unit 870. The system control unit 860 includes an unshown storage apparatus that is, for example, a recording medium. Programs that are necessary for controlling operations of the imaging system and the like are recorded on the recording medium. The system control unit 860 also supplies signals for switching a drive mode in accordance with, for example, a user operation, into the imaging system. More specifically, signals for performing switching operations such as changing a row to be read out or a row to be reset, changing an angle of view accompanying electronic zooming, or shifting the angle of view accompanying electronic vibration control are supplied. The timing control unit 195 controls the drive timing of the pixel array 110 and the signal processing unit 190 based on the control by the system control unit 860.

The solid state imaging apparatus 100 according to the present embodiment provides image output at a high frame rate in which there is little generation of a false color at an edge portion in the images. Accordingly, by mounting the solid state imaging apparatus 100 according to the present embodiment, the imaging system 800 that is capable of highly accurate, high-speed imaging can be realized.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-272655, filed on Dec. 27, 2013, which is hereby incorporated by reference herein in its entirety.

What is claimed is:

1. A solid state imaging apparatus, comprising:
a pixel array in which pixels arrayed in a matrix shape, with each pixel having a color filter of one color, and including a plurality of photodiodes each of which receives an incident light passing through the color filter; and
an adding circuit, wherein
the pixels include a first pixel, a second pixel and a third pixel,
each of the first pixel, the second pixel, and the third pixel has a color filter of a first color, and
the adding circuit performs addition of (i) a signal based on an output of only a part of the plurality of photodiodes of the first pixel, (ii) a signal based on an output of the plurality of photodiodes of the second pixel, and (iii) a signal based on an output of only a part of the plurality of photodiodes of the third pixel.

2. The solid state imaging apparatus according to claim 1, wherein each of the pixels has a microlens, and
a relative position between the part of the plurality of photodiodes of the first pixel and the microlens is different from a relative position between the part of the plurality of photodiodes of the third pixel and the microlens.

3. The solid state imaging apparatus according to claim 1, wherein a color arrangement of the pixels is a Bayer arrangement.

4. The solid state imaging apparatus according to claim 3, wherein the adding circuit comprises a first adding circuit that performs addition of signals output from pixels of a plurality of rows in a one column of the pixel array, and a second adding circuit that performs addition of signals output from pixels of a plurality of columns in a one row of the pixel array.

5. The solid state imaging apparatus according to claim 1, wherein the first pixel, the second pixel, and the third pixel are arranged in one column of the pixel array,
a ratio of a first number, a second number, and a third number is 1:2:1,
the first number is a number of photodiodes used for outputting the signal based on the output of only the part of the plurality of photodiodes of the first pixel,
the second number is a number of photodiodes used for outputting the signal based on the output of the plurality of photodiodes of the second pixel, and
the third number is a number of photodiodes used for outputting the signal based on the output of only the part of the plurality of photodiodes of the third pixel.

6. The solid state imaging apparatus according to claim 5, wherein the pixels further include a fourth pixel and a fifth pixel arranged in the one column of the pixel array,
a color of the color filter of the fourth pixel and a color of the color filter of the fifth pixel are second color different from the first color,
the adding circuit performs addition of (iv) a signal based on an output of only a part of the plurality of photodiodes of the fourth pixel and (v) a signal based on an output of only a part of the plurality of photodiodes of the fifth pixel,
a ratio of a fourth number and a fifth number is 1:1,
the fourth number is a number of photodiodes used for outputting the signal based on the output of only the part of the plurality of photodiodes of the fourth pixel, and
the fifth number is a number of photodiodes used for outputting the signal based on the output of only the part of the plurality of photodiodes of the fourth pixel.

7. The solid state imaging apparatus according to claim 1, wherein the first pixel, the second pixel, and the third pixel are arranged in one row of the pixel array,
a ratio of a first number, a second number, and a third numbers is 1:2:1,
the first number is a number of photodiodes used for outputting the signal based on the output of only the part of the plurality of photodiodes of the first pixel, the second number is a number of photodiodes used for outputting the signal based on the output of the plurality of photodiodes of the second pixel, and the third number is a number of photodiodes used for outputting the signal based on the output of only the part of the plurality of photodiodes of the third pixel.

8. The solid state imaging apparatus according to claim 7, wherein the pixels further include a fourth pixel, and a fifth pixel arranged in the one row of the pixel array, a color of the color filter of the fourth pixel and a color of the color filter of the fifth pixel are second color different from the first color, the adding circuit performs addition of (iv) a signal based on an output of only a part of the plurality of photodiodes of the fourth pixel and (v) a signal based on an output of only a part of the plurality of photodiodes of the fifth pixel, a ratio of a fourth number and a fifth number is 1:1, the fourth number is a number of photodiodes used for outputting the signal based on the output of only the part of the plurality of photodiodes of the fourth pixel, and the fifth number is a number of photodiodes used for outputting the signal based on the output of only the part of the plurality of photodiodes of the fifth pixel.

9. The solid state imaging apparatus according to claim 8, wherein a position of the second pixel is a weighted center position of addition of signals output from each of the first pixel, the second pixel, and the third pixel.

10. The solid state imaging apparatus according to claim 1, wherein each of the pixels has a microlens, and the photodiodes of each one of pixels receive the incident light passing through the microlens and the color filter, in this order.

11. An imaging system comprising a solid state imaging apparatus, said solid state imaging apparatus comprising:

a pixel array in which pixels arrayed in a matrix shape, with each pixel having a color filter of one color, and including a plurality of photodiodes each of which receives an incident light passing through the color filter; and an adding circuit, wherein the pixels include a first pixel, a second pixel and a third pixel, each of the first pixel, the second pixel, and the third pixel has a color filter of a first color, and the adding circuit performs addition of (i) a signal based on an output of only a part of the plurality of photodiodes of the first pixel, (ii) a signal based on an output of the plurality of photodiodes of the second pixel, and (iii) a signal based on an output of only a part of the plurality of photodiodes of the third pixel;

an optical system that forms an image on the plurality of pixels; and a signal processing unit that processes a signal output from the solid state imaging apparatus and generates image data.

* * * * *